(12) United States Patent
Buss

(10) Patent No.: US 10,179,549 B2
(45) Date of Patent: Jan. 15, 2019

(54) CAMERA ASSEMBLY OF A MOTOR VEHICLE

(71) Applicant: HUF HÜLSBECK & FÜRST GMBH & CO. KG, Velbert (DE)

(72) Inventor: Wolfgang Buss, Solingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 15/531,971

(22) PCT Filed: Oct. 8, 2015

(86) PCT No.: PCT/EP2015/073291
§ 371 (c)(1),
(2) Date: May 31, 2017

(87) PCT Pub. No.: WO2016/091422
PCT Pub. Date: Jun. 16, 2016

(65) Prior Publication Data
US 2017/0341597 A1 Nov. 30, 2017

(30) Foreign Application Priority Data
Oct. 8, 2015 (DE) ........................ 10 2014 118 220

(51) Int. Cl.
B60S 1/52 (2006.01)
B60S 1/56 (2006.01)
(Continued)

(52) U.S. Cl.
CPC ................. *B60R 11/04* (2013.01); *B60S 1/52* (2013.01); *B60S 1/56* (2013.01); *G02B 27/0006* (2013.01);
(Continued)

(58) Field of Classification Search
CPC ............... B60R 11/04; B60R 2300/101; B60R 2300/80; B60S 1/52; B60S 1/56; G02B 27/0006; G03B 17/568
See application file for complete search history.

(56) References Cited

U.S. PATENT DOCUMENTS 9,915,821 B2 * 3/2018 Macchia .............. G03B 17/568
2010/0027119 A1 2/2010 Kollar et al.
(Continued)

FOREIGN PATENT DOCUMENTS

DE 103 18 987 B3 9/2004
DE 10 2005 021 672 A1 11/2006
(Continued)

OTHER PUBLICATIONS

International Preliminary Report on Patentability of International Application No. PCT/EP2015/073291 dated Jun. 13, 2017 and English Translation, 14 pages.
(Continued)

Primary Examiner — Amy R Hsu
(74) Attorney, Agent, or Firm — Fay Sharpe LLP

(57) ABSTRACT

A camera assembly of a motor vehicle includes a carrier which is adapted to be fastened to the motor vehicle and a camera unit which is immovably fastened to the carrier and has an objective. A cleaning unit is supported on the carrier and is connected to a fluid line that conducts a cleaning fluid which is used to clean the objective. A flap element is provided which is adapted to be moved into a cleaning position and into a resting position. The flap element is retracted in an accommodating chamber of the carrier in the resting position and is extended out of the accommodating chamber so that the flap element covers the objective of the camera unit in the cleaning position.

8 Claims, 3 Drawing Sheets

(51) Int. Cl.
  *B60R 11/00* (2006.01)
  *B60R 11/04* (2006.01)
  *G02B 27/00* (2006.01)
  *G03B 17/56* (2006.01)

(52) U.S. Cl.
  CPC ...... *G03B 17/568* (2013.01); *B60R 2011/004* (2013.01); *B60R 2300/101* (2013.01); *B60R 2300/80* (2013.01)

(56) References Cited

U.S. PATENT DOCUMENTS

| | | | |
|---|---|---|---|
| 2011/0073142 A1 | 3/2011 | Hattori et al. | |
| 2011/0266375 A1* | 11/2011 | Ono | B60S 1/0848 239/589 |
| 2014/0192410 A1* | 7/2014 | Yoshimura | B60R 11/04 359/509 |
| 2015/0201826 A1* | 7/2015 | Hsu | A61B 1/00135 600/121 |
| 2016/0161831 A1* | 6/2016 | Samardzic | B60R 11/04 396/428 |

FOREIGN PATENT DOCUMENTS

| | | | | |
|---|---|---|---|---|
| DE | 102005021672 A1 | * | 11/2006 | ............... B60R 1/00 |
| DE | 102005021672 A1 | * | 11/2006 | ............... B60R 1/00 |
| DE | 10 2008 008 656 A1 | | 8/2009 | |
| DE | 10 2010 005 311 A1 | | 9/2010 | |
| EP | 1 332 923 A2 | | 8/2003 | |

OTHER PUBLICATIONS

International Search Report of International Application No. PCT/EP2015/073291 dated Dec. 23, 2015, 6 pages.

* cited by examiner

CAMERA ASSEMBLY OF A MOTOR VEHICLE

BACKGROUND

The invention relates to a camera assembly of a motor vehicle, comprising a carrier, which can be fastened to a motor vehicle, a camera assembly, which is immovably fastened to the carrier and has an objective, and a cleaning unit, which is supported on the carrier and which is connected to a fluid line that conducts a cleaning fluid and which is used to clean the objective.

The use of camera units for perceiving the vehicle surroundings is well-known. For example, such camera units are used as parking assistance and/or maneuvering systems for motor vehicles, particularly to perceive the areas that are inaccessible with a conventional mirror. Usually, a camera unit is arranged at the rear end of the motor vehicle as an electronic parking assistance. By means of said camera unit, it is possible to perceive or film the surrounding area behind the motor vehicle. Generally, such a camera unit is activated when the reverse gear is engaged and the image is shown on a display in the cockpit of the motor vehicle. Usually, such camera units are attached outside of the vehicle at a position where they have a free view to the outside on the area to be perceived. However, the function of such camera units is only reliably ensured when the pictures taken with the camera assemblies are of good quality. The quality of the pictures is especially determined, as well as reduced, by contaminations of the objective of the camera unit.

DE 103 18 987 B3 disclosed a camera assembly, which is used to monitor the space behind a motor vehicle. For this purpose, a camera unit, i.e., a video camera, is installed at the rear end of the motor vehicle, the monitoring images of which are visible on a screen arranged in the driver's field of view. In these well-known camera assemblies, the objective of the camera unit is basically arranged inside the contour of the rear of the motor vehicle and is aligned diagonally downward to the rear. To reduce the risk of contamination of the objective of the camera unit, the rear end of the motor vehicle is provided with a depression, which has a stepped upper partition wall with an opening for a camera unit. The camera unit is mostly covered in the upper area of the depression. However, this arrangement has the disadvantage that it is difficult to access the objective of the camera unit for manual cleaning if the objective is contaminated.

For example, a camera assembly of the type mentioned above is known from DE 10 2010 005 311 A1, in which a camera unit is immovably assembled in the back door of a motor vehicle. In this camera assembly, the objective of the camera unit is arranged mostly covered inside the contour of the rear of the motor vehicle and is aligned diagonally downward to the rear. To avoid manual cleaning of the objective, a cleaning unit is arranged below the objective of the camera unit. The nozzle of the cleaning unit is directed to the objective of the camera unit. This prior art has the disadvantage that during the cleaning process the cleaning fluid can bounce off the objective in an uncontrolled manner and be sprayed to the surrounding area. As a result, for example, people in the immediate surroundings of the back door of the motor vehicle could be accidentally sprayed with cleaning fluid.

BRIEF SUMMARY

The invention is based on the objective of solving the problem by providing in a constructively simple and cost-effective manner a camera assembly, which offers increased comfort and overcomes the disadvantages of the prior art.

According to the invention, in a camera assembly of the type mentioned above, the problem is solved in that a flap element is provided, which can be moved into a cleaning position and into a resting position, wherein the flap element is arranged so as to be retracted in an accommodating chamber of the carrier in the resting position and is arranged so as to be extended out of the accommodating chamber in such a way that the flap element covers the objective of the camera unit in the cleaning position.

Advantageous and practical embodiments and further developments of the invention are included in the sub-claims.

The invention provides a camera assembly, which is characterized by a functional design and has a simple and cost-effective structure. Because of the fact that the flap element covers the objective of the camera unit in the cleaning position, the external surroundings of the camera unit are shielded from the cleaning process of the objective. As a result, there is no risk that people in the immediate surroundings are sprayed with cleaning fluid. Cleaning fluid bouncing off the objective is intercepted by the flap element and not sprayed to the external surroundings of the camera unit or camera assembly but, instead is dripping down from the flap element.

In one embodiment of the inventive camera assembly, it is provided that the cleaning unit is designed to be movable in relation to the objective of the camera unit. For cleaning the objective, it is advantageous when the cleaning unit can be arranged directly in front of the objective. However, this arrangement cannot be maintained because then the cleaning unit would cover the view of the camera unit and, as a result, the perception of the vehicle surroundings or the perception of the space to which the camera is directed would fail. Therefore, it is advantageous when the cleaning unit can be moved in relation to the objective, so that for the purpose of cleaning the cleaning unit is arranged in front of the objective and, when the cleaning process is concluded, the cleaning unit is moved out of the field of view or recording area of the camera unit.

An especially advantageous and structurally efficient possibility of achieving that the cleaning unit is arranged in front of the objective only during the actual cleaning process is provided in a further embodiment of the camera assembly in that the cleaning unit is connected in movable fashion with the flap element. When a cleaning process is to take place, the flap element is moved in front of the objective to prevent the cleaning fluid bouncing off the objective from being sprayed in uncontrolled manner to the surrounding are of the motor vehicle. The cleaning unit is arranged in front of the objective at the same time when the arrangement of the flap element is in its cleaning position, which is possible as a result of the motion coupling, because the flap element, as well as the cleaning unit must be arranged in front of the objective during the cleaning process. When the actual cleaning process is concluded, the motion coupling results in the fact that the cleaning unit is moved when the flap element is moved into its resting position and is thus moved out of the field of view or recording area of the camera unit. Consequently, the cleaning unit and the flap element are coupled with each other with respect to movement.

A further embodiment of the invention provides that for cleaning the objective of the camera unit, the cleaning unit is designed in such a way that it is moved together with the flap element into the cleaning position, in which the objective is covered.

It is especially advantageous when in a further embodiment of the inventive camera assembly the cleaning unit is fastened on the lateral surface of the flap element facing the objective. This design ensures that the cleaning unit is moved along with the flap element and, accordingly, is arranged in a cleaning position or in a position outside of the field of vision of the camera unit.

In a further embodiment of the camera assembly, the invention provides that the cleaning unit and the flap element are designed in the form of a single and mutually movable component. This structural embodiment also ensures that the cleaning unit moves along with the flap element, which results in the fact that the cleaning unit is arranged in a cleaning position or in a position outside of the field of vision of the camera unit.

To increase the cleaning effect, it is advantageous when the cleaning fluid impacts the objective with high speed or high pressure to remove even the toughest contamination. For this purpose, the invention provides in a further embodiment that the cleaning unit has at least one nozzle applying the cleaning fluid to the objective.

To achieve an effective cleaning process, it is also advantageous when the at least one nozzle of the cleaning unit preferably sprays the cleaning fluid with high pressure on the objective of the camera unit in order to clean the objective of the camera unit. This measure can also increase the cleaning effect of the cleaning unit.

To be able to move the flap element into the resting position and into the cleaning position and to move the cleaning unit that is motion-coupled with the flap element, the inventive embodiment of the camera assembly provides that the flap element is connected with a drive unit, by means of which the flap element can be moved into the cleaning position and the resting position. This can involve a small-scale actuator, which is controlled by a control unit on board of the vehicle to adjust the flap element.

In the embodiment of the invention, it is especially advantageous when the fluid line is conducted via the flap element to the cleaning unit and designed in such a way that it can be moved together with the flap element into its resting position and cleaning position.

Finally, the inventive embodiment of the camera assembly provides that a fluid supply line, which conducts a drying fluid for drying the objective of the camera unit, is connected with the cleaning unit or the flap element or the accommodating chamber. In the event that the cleaning unit uses a liquid as cleaning fluid the drying fluid, which is gaseous and preferably air, the drying fluid can be used for quickly drying the objective to prevent, for example, that droplets of the cleaning fluid affect the image supplied by the camera unit.

For example, the drying fluid can be conveyed to a nozzle or spraying device, which is attached at the cleaning unit or at the flap element or at the accommodating chamber and which is directed to the objective of the camera unit. It is clear that the characteristics mentioned above and those that are following, which shall be explained, cannot only be used in the combinations listed, but also in other combinations or simply by themselves without leaving the scope of the present invention. The scope of the invention is only defined by the claims.

BRIEF DESCRIPTION OF THE DRAWINGS

Further details, characteristics or advantages of the subject matter of the invention are included in the following description in conjunction with the drawing, in which a preferred embodiment of the invention is shown in an exemplary manner. The drawing shows.

DETAILED DESCRIPTION

Figure 1:
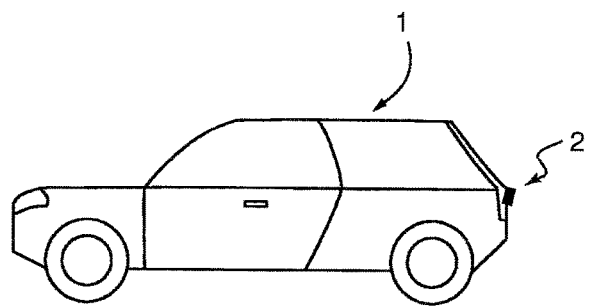
FIG. 1 a diagram of a motor vehicle with a camera assembly indicated in an exemplary manner, FIG. 2 a perspective view of the inventive camera assembly, in which a flap element is arranged in a resting position, FIG. 3 a perspective view of the inventive camera assembly, in which a flap element is arranged in a cleaning position, FIG. 4 a perspective, exploded view of the inventive camera assembly, FIG. 5 a perspective view of the flap element and a cleaning unit attached to it, FIG. 6 a perspective view of the flap element and the cleaning unit, and FIG. 7 a different perspective view of the flap element and the cleaning unit.

FIG. 1 shows the diagram of a motor vehicle 1, on the rear end of which a camera assembly 2 is attached, which is used as a parking assistance and/or maneuvering system and to monitor the space behind the motor vehicle 1. The inventive camera assembly 2 is shown in detail in FIGS. 2, 3 and 4 and comprises a carrier 3, a camera unit 4 with an objective 5, a cleaning unit 6 and a flap element 7, wherein the cleaning unit 6 and the flap element 7 are especially presented in FIGS. 5, 6 and 7. However, the inventive camera assembly 2 cannot only be used in an automobile 1 but also in a utility vehicle.

Figure 2:
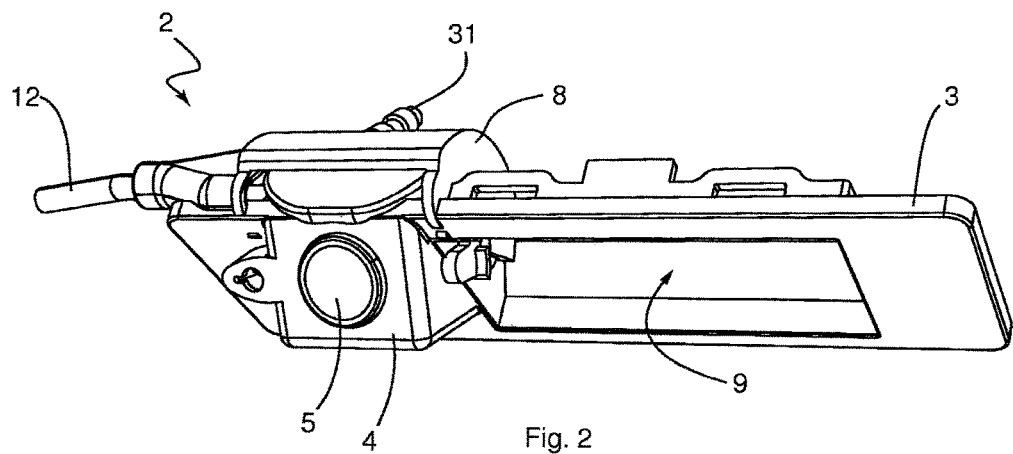
Figure 3:
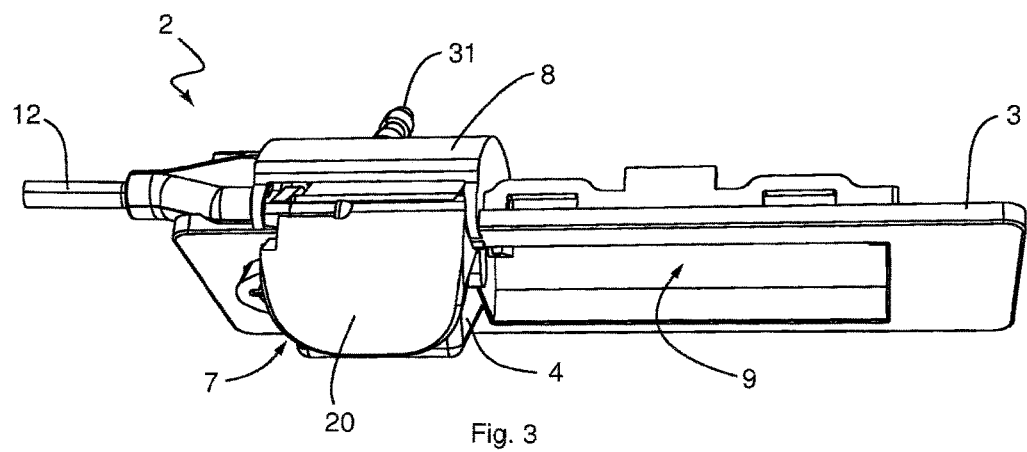
Figure 4:
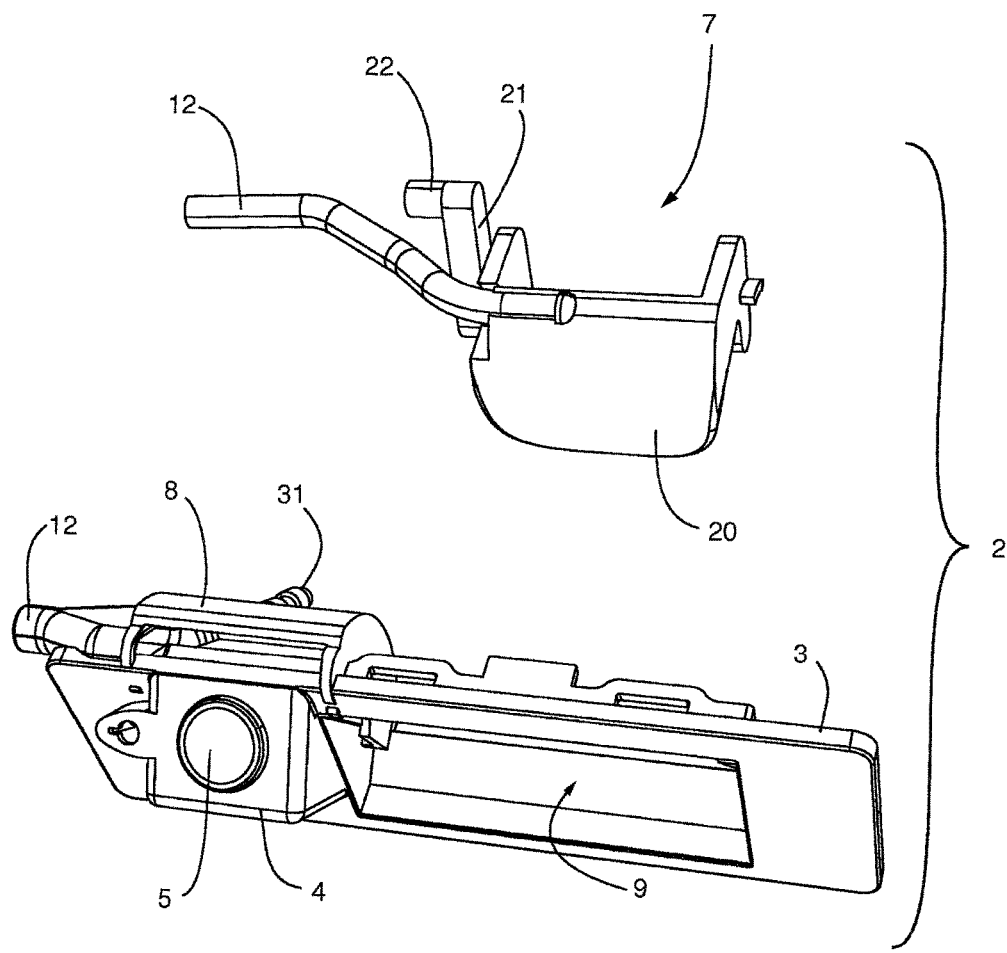

The carrier 3 shown in FIGS. 2, 3 and 4 is attached at the rear end of the motor vehicle 1, so that the embodiment described involves a camera unit 4 designed in the form of a rear view camera, which is immovably fastened to the carrier 3 and inclined downward. The carrier 3 comprises an accommodating chamber 8, which receives the camera unit 4 in such a way that basically only the objective 5 protrudes to the outside. The flap element 7 is retracted into its resting position, which is shown in FIG. 2, in the accommodating chamber 8, so that the objective 5 has a free view on the rear area to be monitored. In the resting position, the flap element 7 is virtually not visible from the outside, which increases the external appearance of the camera assembly 2 and enhances the value of the camera assembly 2. The flap element 7 has a flap 20, which is used to cover the objective 5, when the objective 5 is cleaned. The cleaning, which is performed behind the flap 20 by means of the cleaning unit 6 arranged between the flap 20 and the objective 5, should prevent that cleaning fluid is sprayed in an uncontrolled manner to the area surrounding the motor vehicle 1, for example, to persons passing by. On the side, the flap 20 has a swivel arm 21, which has a spindle 22 integrally shaped on its free end. Said spindle 22 interacts with a supporting element which is respectively formed in the accommodating chamber 8, so that the flap 20 is swiveled about the spindle 22 when moved into the resting position and into the cleaning position. In the embodiment shown, the carrier 3 also comprises a passage 9 for a door handle module (not shown in the figures), which can be mounted on the carrier 3 or at least behind the carrier 3, it can be fastened to the body of the motor vehicle 1.

The cleaning position of the flap element 7 is shown in FIG. 3. In the cleaning position, the flap element 7 is arranged in front of the objective 5. The cleaning unit 6, which is used to clean the objective 5, is supported via the flap element 7 at the carrier 3. The cleaning unit 6 is fastened on the flap element 7. More precisely, the cleaning unit 6 is attached on the lateral surface 10 of the flap element 7, which is facing the objective 5, as shown, for example, in FIGS. 5, 6 and 7. Therefore, the cleaning unit 6 and the flap element 7 are formed as an integral component 11. As a result, the cleaning unit 6 is designed in such a way that it can be moved together with flap element 7. In particular, the cleaning unit 6 is designed in such a way that it can be moved in relation to the objective 5 of the camera unit 4, which results from the fact that the cleaning unit 6 is connected in motion-coupled manner with the flap element 7. Consequently, the cleaning unit is designed in such a way that it moves together with the flap element 7 into the cleaning position that covers the objective 5 in order to clean the objective 5 of the camera unit 4.

The cleaning unit 6 used for cleaning the objective 5 is connected with a fluid line 12. Via the fluid line 12, the cleaning unit 6 is supplied with a cleaning fluid, wherein the cleaning fluid can comprise a liquid or air, in order to clean the surface of the objective 5. The fluid line 12, which has a tubular and flexible design, extends outside at the carrier 3 and enters via an opening the accommodating chamber 8, in which the flap element 7 is swivel-mounted. In other words, the fluid line 12 extends via the flap element 7 to the cleaning unit 6, wherein the cleaning unit 6 is designed in such a way that it can be moved together with the flap element 7 into its resting position and cleaning position. The fluid line 12 is connected to the cleaning unit 6 via an adapter piece 14 formed at the cleaning unit 6 and can supply the cleaning unit 6 with cleaning fluid.

Figure 5:
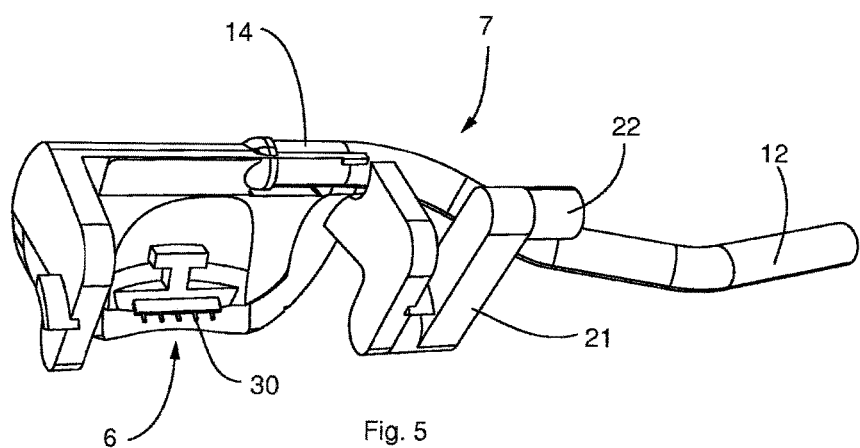
Figure 6:
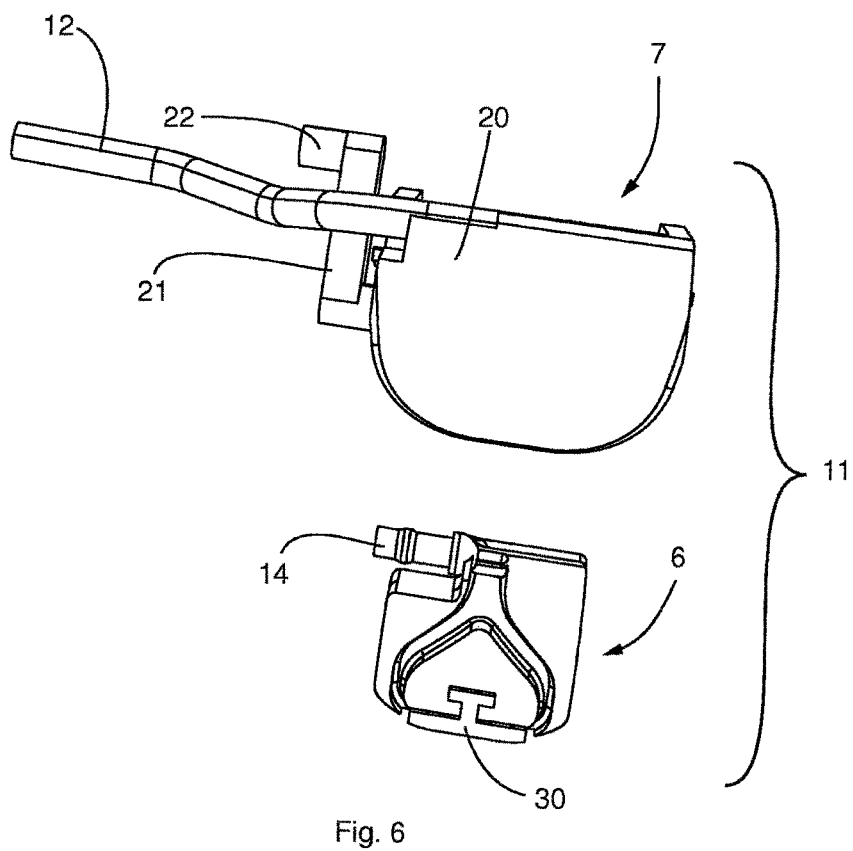
Figure 7:
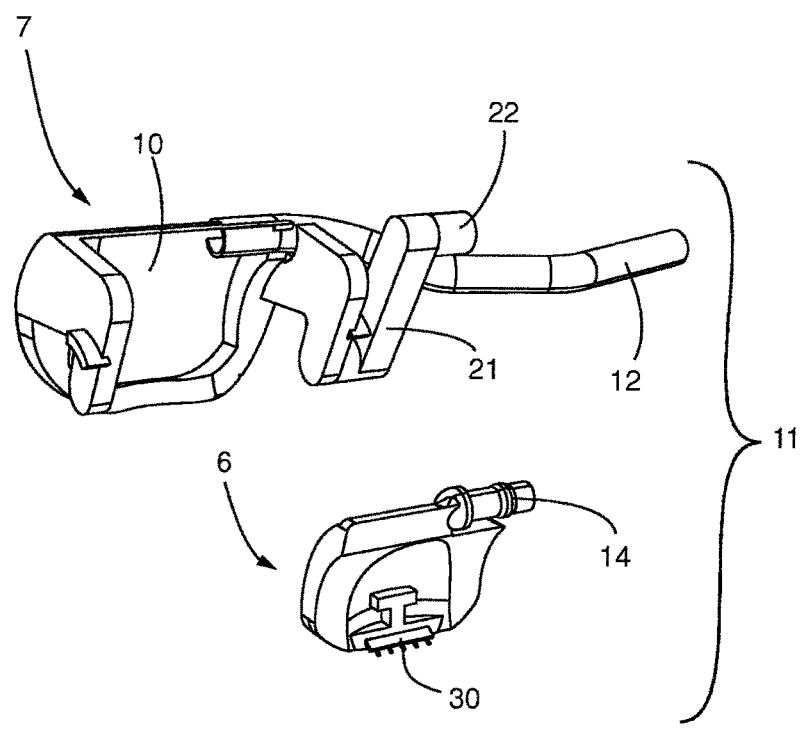

For example, as shown in FIGS. 5 and 7, the cleaning unit 6 displayed in the embodiment of the camera assembly 2 comprises multiple nozzles 30, which are arranged next to each other and supplied with cleaning fluid by a duct system (not shown) formed in the cleaning unit 6, in order to apply the cleaning fluid to the objective 5 and to clean it. To increase the cleaning effect, the cleaning fluid is supplied under high pressure to the cleaning unit 6, wherein the nozzles 30 also ensure that the cleaning fluid is sprayed with high pressure on the objective 5 in order to clean the objective 5 of the camera unit 4.

If the cleaning fluid involves a liquid, the surface of the objective 5 can be actively dried. For this purpose, the invention provides a fluid supply line 31, through which a drying fluid, i.e., air, is supplied to the accommodating chamber 8. In the area of the fluid supply line 31, the accommodating chamber 8 is arched in the direction of the objective 5 to conduct and direct the drying fluid appropriately to the surface of the objective 5.

As an alternative to supplying the accommodating chamber 8, the drying fluid can also be supplied to the flap element 7 or to the cleaning unit 6, which then conduct by means of special embodiments the drying fluid to the surface of the objective 5. For example, the nozzles of the cleaning unit 6 can be provided with a switch valve and , so that the nozzles 30 are first supplied with the cleaning fluid and after the cleaning with the drying fluid.

Finally, it is possible to attach to the cleaning unit 6 in the area below the nozzles 30 a rubber-elastic strip edge in the form of a wiper's edge, which is moved from the cleaning position to the resting position across the surface of the objective 5 when the flap element is moving 7 and at the same time removes residues of the cleaning fluid from the objective 5.

In conclusion, it should be noted that the flap element 7 is connected with and driven by a drive unit (not shown in the figures). The drive unit ensures that the flap element 7 can be moved into the cleaning position, in which the flap element 7 is arranged so as to be extended out of the accommodating chamber 8 in such a way that it covers the objective 5 of the camera unit 4 and into the resting position, in which the flap element 7 is arranged so as to be retracted in the accommodating chamber 8 of the carrier 3.

Naturally, the invention described above is not limited to the embodiment described and shown. It is obvious that numerous modifications can be made to the embodiment shown in the drawing, which are obvious to a skilled person according to the intended application, without leaving the scope of the invention. For example, the cleaning of the objective 5 can be performed not only in the cleaning position of the flap element 7. Rather, the cleaning process can already be started when the flap element is moved from the resting position to the cleaning position. It is also possible to perform the cleaning only during the movement of the flap element 6. The invention includes everything contained in the description and/or shown in the drawing, including everything that is obvious to a skilled person although it differs from the concrete embodiments.

The invention claimed is:

1. A camera assembly of a motor vehicle, comprising a carrier, which is adapted to be fastened to the motor vehicle, a camera unit, which is immovably fastened to the carrier and has an objective, and a cleaning unit which is supported on the carrier and which is connected to a fluid line that conducts a cleaning fluid and which is used to clean the objective, wherein a flap element is provided, which is adapted to be moved into a cleaning position and into a resting position, wherein the flap element is arranged so as to be retracted in an accommodating chamber of the carrier in the resting position and is arranged so as to be extended out of the accommodating chamber in such a way that the flap element covers the objective of the camera unit in the cleaning position,
   wherein the cleaning unit is motion-coupled with the flap element, and
   wherein for cleaning the objective of the camera unit, the cleaning unit is designed in such a way that it is moved together with the flap element into the cleaning position, in which the objective is covered.

2. A camera assembly according to claim 1, wherein the cleaning unit is designed in such a way that it can be moved in relation to the objective of the camera unit.

3. A camera assembly according to, claim 1, wherein the cleaning unit is fastened on a lateral surface of the flap element facing the objective.

4. A camera assembly according to claim 1, wherein the cleaning unit and the flap element are designed in the form of a single and mutually movable component.

5. A camera assembly according to claim 1, wherein the cleaning unit has at least one nozzle applying the cleaning fluid to the objective.

6. A camera assembly according to claim 5, wherein for cleaning the objective of the camera unit the at least one nozzle of the cleaning unit sprays the cleaning fluid with high pressure on the objective of the camera unit.

7. A camera assembly according to claim 1, wherein the fluid line is conducted via the flap element to the cleaning unit and is adapted to be moved together with the flap element into its resting position and cleaning position.

8. A camera assembly according to claim 1, wherein a fluid supply line, which conducts a drying fluid for drying the objective, is connected with at least one of the cleaning unit, the flap element, and the accommodating chamber.

* * * * *

UNITED STATES PATENT AND TRADEMARK OFFICE
CERTIFICATE OF CORRECTION

| | |
|---|---|
| PATENT NO. | : 10,179,549 B2 |
| APPLICATION NO. | : 15/531971 |
| DATED | : January 15, 2019 |
| INVENTOR(S) | : Wolfgang Buss |

Page 1 of 1

It is certified that error appears in the above-identified patent and that said Letters Patent is hereby corrected as shown below:

On the Title Page

Under item (30) Foreign Application Priority Data, the correct priority data should read as follows:
--Dec. 9, 2014   (DE) .................... 10 2014 118 220--.

Signed and Sealed this
Sixteenth Day of April, 2019

Andrei Iancu
*Director of the United States Patent and Trademark Office*